United States Patent
Cai et al.

(10) Patent No.: US 10,736,066 B2
(45) Date of Patent: Aug. 4, 2020

(54) DEVICE-TO-DEVICE D2D COMMUNICATION METHOD AND D2D TERMINAL DEVICE

(71) Applicant: Huawei Technologies Co., Ltd., Shenzhen (CN)

(72) Inventors: Yu Cai, Beijing (CN); Yongbo Zeng, Beijing (CN); Bin Liu, San Diego, CA (US); Jian Wang, Beijing (CN); Nathan Edward Tenny, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/301,332

(22) PCT Filed: May 13, 2016

(86) PCT No.: PCT/CN2016/081960
§ 371 (c)(1),
(2) Date: Nov. 13, 2018

(87) PCT Pub. No.: WO2017/193355
PCT Pub. Date: Nov. 16, 2017

(65) Prior Publication Data
US 2019/0200313 A1    Jun. 27, 2019

(51) Int. Cl.
*H04W 56/00*    (2009.01)
*H04W 4/70*    (2018.01)
(Continued)

(52) U.S. Cl.
CPC ......... *H04W 56/0025* (2013.01); *H04L 43/16* (2013.01); *H04W 4/70* (2018.02); *H04W 24/08* (2013.01); *H04W 56/0045* (2013.01)

(58) Field of Classification Search
CPC . H04W 80/02; H04W 12/1203; H04W 28/20; H04W 76/28; H04B 7/06; H04B 7/0639; G06T 19/006
See application file for complete search history.

(56) References Cited

U.S. PATENT DOCUMENTS 10,064,124 B2 *   8/2018   Lindoff ................. H04W 76/28
2015/0215883 A1   7/2015   Zheng et al.
(Continued)

FOREIGN PATENT DOCUMENTS

CN   104581927 A   4/2015
CN   104812058 A   7/2015
(Continued)

OTHER PUBLICATIONS

Foreign Communication From a Counterpart Application, European Application No. 16901310.9, Partial Supplementary European Search Report dated Mar. 28, 2019, 10 pages.
(Continued)

*Primary Examiner* — Iqbal Zaidi
(74) *Attorney, Agent, or Firm* — Conley Rose, P.C.

(57) ABSTRACT

A device-to-device (D2D) communication method and a D2D terminal device, where the method includes determining, by a first device, a time that the first device is out of coverage of a synchronization source after leaving the coverage of the synchronization source determining, by the first device, target timing based on the time, and performing, by the first device, D2D communication based on the target timing. Hence, the target timing can be selected more accurately for the first device.

19 Claims, 4 Drawing Sheets

(51) Int. Cl.
*H04L 12/26* (2006.01)
*H04W 24/08* (2009.01)

(56) References Cited

U.S. PATENT DOCUMENTS

| | | | | |
|---|---|---|---|---|
| 2016/0255562 | A1* | 9/2016 | Sharma | H04W 36/24 370/331 |
| 2017/0289870 | A1 | 10/2017 | Liu et al. | |
| 2018/0262308 | A1* | 9/2018 | Si | H04L 5/0051 |

FOREIGN PATENT DOCUMENTS

| | | |
|---|---|---|
| CN | 104812059 A | 7/2015 |
| CN | 105101391 A | 11/2015 |
| CN | 105517139 A | 4/2016 |
| WO | 2015109961 A1 | 7/2015 |
| WO | 2015111851 A1 | 7/2015 |
| WO | 2015119428 A1 | 8/2015 |
| WO | 2015119429 A1 | 8/2015 |

OTHER PUBLICATIONS

Alcatel-Lucent, et al., "Physical Channel Design for D2D Communication," R1-134228, 3GPP TSG RAN WG1 Meeting #74bis, Guangzhou, China, Oct. 7-11, 2013, 3 pages.

Foreign Communication From a Counterpart Application, Chinese Application No. 201680085445.1, Chinese Office Action dated Nov. 28, 2019, 8 pages.

Machine Translation and Abstract of Chinese Publication No. CN104581927, Apr. 29, 2015, 17 pages.

Machine Translation and Abstract of Chinese Publication No. CN104812059, Jul. 29, 2015, 27 pages.

Machine Translation and Abstract of Chinese Publication No. CN105101391, Nov. 25, 2015, 30 pages.

Machine Translation and Abstract of Chinese Publication No. CN105517139, Apr. 20, 2016, 22 pages.

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331, V13.1.0, Technical Specification, Mar. 2016, 551 pages.

Huawei, et al., "Synchronization procedure and synchronization source priority for V2V," 3GPP TSG RAN WG1 Meeting #84, R1-160306, Feb. 15-19, 2016, 6 pages.

Huawei, et al., "Synchronization priority and timing consideration for V2V," 3GPP TSG RAN WG1 Meeting #84bis, R1-162639, Apr. 11-15, 2016, 7 pages.

Foreign Communication From A Counterpart Application, PCT Application No. PCT/CN2016/081960, English Translation of International Search Report dated Jan. 25, 2017, 2 pages.

Foreign Communication From A Counterpart Application, PCT Application No. PCT/CN2016/081960, English Translation of Written Opinion dated Jan. 25, 2017, 6 pages.

* cited by examiner

DEVICE-TO-DEVICE D2D COMMUNICATION METHOD AND D2D TERMINAL DEVICE

CROSS-REFERENCE TO RELATED APPLICATIONS

This application is a U.S. National Stage of International Patent Application No. PCT/CN2016/081960 filed on May 13, 2016, which is hereby incorporated by reference in its entirety.

TECHNICAL FIELD

The present invention relates to the communications field, and more specifically, to a device-to-device D2D communication method and a D2D terminal device.

BACKGROUND

Device-to-device (Device-to-Device, D2D) communication is a technology that allows terminals to communicate with each other directly by reusing cell resources under system control. In a D2D communication process, to ensure that a terminal can send or receive information accurately, devices performing D2D communication need to be in a synchronized state.

Figure 1:
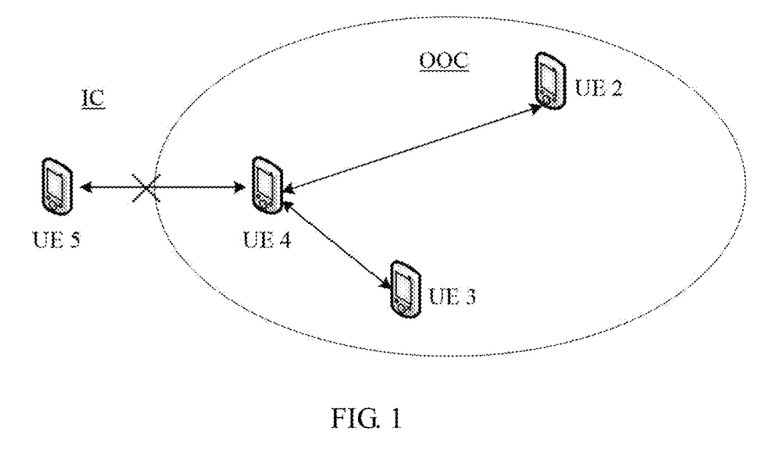
FIG. 1 is a schematic diagram of a prior-art method for implementing synchronization between D2D terminals.

In the prior art, user equipments (User Equipment, UE) are usually classified based on coverage. UE located in coverage (In-coverage, IC) of a synchronization source selects the synchronization source as a synchronization reference device of the UE; and UE located out of coverage (Out-of-coverage, OOC) of the synchronization source selects an adjacent UE with a highest priority as a synchronization reference device of the UE. Specifically, as shown in FIG. 1, UE 4 just moves to the OOC from the IC, and a specific process of selecting a synchronization reference device by the UE 4 is as follows:

101. The UE 4 receives synchronization information sent by surrounding UE 2 and UE 3.

102. The UE 4 determines priorities of the UE 2 and the UE 3 based on the received synchronization information, and determines that the UE 3 has a higher priority than the UE 2.

103. The UE 4 selects the UE 3 as the synchronization reference device.

When selecting the synchronization reference device, the UE 4 considers only the UE 2 and the UE 3. If both the UE 2 and the UE 3 are located OOC, or if priorities of both the UE 2 and the UE 3 are relatively low, the method in which the UE 4 selects a device with a higher priority from the UE 2 and the UE 3 as the synchronization reference device is not accurate.

SUMMARY

This application provides a DD2 communication method and a D2D terminal device, so as to select target timing more accurately.

According to a first aspect, the present invention provides a D2D communication method, including: determining, by a first device, a time the first device is out of coverage of a synchronization source after leaving the coverage of the synchronization source; determining, by the first device, target timing based on the time; and performing, by the first device, D2D communication based on the target timing.

Different from the prior art in which target timing is determined based on only found synchronization information of another device, in this embodiment of the present invention, the time the first device is out of the coverage of the synchronization source after leaving the coverage of the synchronization source is considered during determining of the target timing. In this way, the target timing can be selected more accurately for the first device.

With reference to the first aspect, in a first implementation of the first aspect, the determining, by the first device, target timing based on the time includes: when the time is less than a first threshold, determining, by the first device, timing of the first device as the target timing.

With reference to the first aspect, in a second implementation of the first aspect, the method further includes: finding, by the first device, synchronization information of another device; and determining, by the first device, the target timing based on the time and the synchronization information of the another device.

With reference to the second implementation of the first aspect, in a third implementation of the first aspect, the determining, by the first device, the target timing based on the time and the synchronization information of the another device includes: when the time is less than a second threshold, and the first device finds synchronization information of a target device from the synchronization information of the another device, determining, by the first device, timing of the target device as the target timing; or when the time is less than the second threshold, and the first device fails to find synchronization information of a target device from the synchronization information of the another device, determining, by the first device, timing of the first device as the target timing, where the target device is a device in the coverage of the synchronization source, or the target device is a device that selects a device in the coverage of the synchronization source as a synchronization reference source.

With reference to the second implementation of the first aspect, in a fourth implementation of the first aspect, the determining, by the first device, the target timing based on the time and the synchronization information of the another device includes: when the time is less than a third threshold, determining, by the first device, timing of the first device as the target timing; or when the time is greater than the third threshold but less than a fourth threshold, and the first device finds synchronization information of a target device from the synchronization information of the another device, determining, by the first device, timing of the target device as the target timing; or when the time is greater than the third threshold but less than the fourth threshold, and the first device fails to find synchronization information of a target device from the synchronization information of the another device, determining, by the first device, timing of the first device as the target timing, where the target device is a device in the coverage of the synchronization source, or the target device is a device that selects a device in the coverage of the synchronization source as a synchronization reference source.

With reference to the second implementation of the first aspect, in a fifth implementation of the first aspect, the determining, by the first device, the target timing based on the time and the synchronization information of the another device includes: when the time is greater than the second threshold, selecting, by the first device, a target device from the another device based on the synchronization information of the another device, and determining timing of the target device as the target timing.

With reference to any one of the second to the fifth implementations of the first aspect, in a sixth implementation of the first aspect, the method further includes: finding, by the first device, synchronization information of a second device, where the synchronization information of the second device includes indication information that indicates a time the second device is out of the coverage of the synchronization source after leaving the coverage of the synchronization source; and determining, by the first device, the target timing based on the time and the indication information.

With reference to any one of the second to the fifth implementations of the first aspect, in a seventh implementation of the first aspect, the method further includes: finding, by the first device, synchronization information of a second device, where the synchronization information of the second device includes indication information that indicates a time the second device is out of the coverage of the synchronization source after leaving the coverage of the synchronization source; and determining, by the first device, the target timing based on the time, the indication information, and the synchronization information of the another device.

With reference to the first implementation of the first aspect, in an eighth implementation of the first aspect, the first threshold is preconfigured.

With reference to the first implementation of the first aspect, in a ninth implementation of the first aspect, the first threshold is configured by a base station.

With reference to the first implementation of the first aspect, in a tenth implementation of the first aspect, the first threshold is indicated by using system information sent by a base station or by using a sidelink master information block MIB-SL sent by a device different from the first device.

According to a second aspect, the present invention provides a D2D communication method, including: finding, by a first device, synchronization information of a second device, where the synchronization information of the second device includes indication information that indicates a time the second device is out of coverage of a synchronization source after leaving the coverage of the synchronization source; selecting, by the first device, a synchronization reference source based on the indication information; and performing, by the first device, D2D communication based on timing of the synchronization reference source.

Different from the prior art in which target timing is determined based on only found synchronization information of another device, in this embodiment of the present invention, the time the second device is out of the coverage of the synchronization source after leaving the coverage of the synchronization source is considered during determining of the target timing. In this way, the target timing can be selected more accurately for the first device.

With reference to the second aspect, in a first implementation of the second aspect, the selecting, by the first device, a synchronization reference source based on the indication information includes: determining, by the first device, a priority of the second device based on the indication information; and when the first device fails to find another device whose priority is higher than the priority of the second device, selecting, by the first device, the second device as the synchronization reference source.

With reference to the second aspect or the first implementation of the second aspect, in a second implementation of the second aspect, the indication information is indicated by using a sidelink synchronization signal SLSS or a sidelink master information block MIB-SL.

According to a third aspect, the present invention provides a D2D terminal device, where the D2D terminal includes modules that are configured to execute the method in the first aspect.

According to a fourth aspect, the present invention provides a D2D terminal device, where the D2D terminal includes modules that are configured to execute the method in the first aspect.

In some of the foregoing implementations, the first device is a device that is located out of the coverage of the synchronization source, and the first device is a device that is to perform D2D communication.

In some of the foregoing implementations, the another device includes a device that is located in the coverage of the synchronization source.

In some of the foregoing implementations, the another device includes a device that is located out of the coverage of the synchronization source.

In some of the foregoing implementations, the synchronization source is any one of a base station, a cell, a global navigation satellite system GNSS, or an equivalent GNSS.

In some of the foregoing implementations, the first device finds synchronization includes indication information that indicates a time the second device is out of the coverage information of a second device, where the synchronization information of the second device of the synchronization source after leaving the coverage of the synchronization source; and the first device determines the target timing based on times the first device and the second device are out of the coverage of the synchronization source after leaving the coverage of the synchronization source.

In some of the foregoing implementations, when the first device performs D2D communication, a clock of the first device is consistent with a clock of the synchronization reference source. In other words, the first device uses timing of the synchronization reference source as target timing, and performs D2D communication based on the target timing.

In some of the foregoing implementations, the first threshold and/or the second threshold and/or the third threshold are/is specified in a standard. In other words, these thresholds have been specified in a related communication standard.

In some of the foregoing implementations, the first threshold and/or the second threshold and/or the third threshold may be specifically represented in the following form: a string of bits, some predefined enumerated values (each enumerated value may be corresponding to one threshold), or some predefined integers (each integer is corresponding to one threshold).

In some of the foregoing implementations, the synchronization information includes a sidelink synchronization signal SLSS and a sidelink master information block MIB-SL. Specifically, a device may determine a corresponding SLSSID by detecting the sidelink synchronization signal SLSS. The SLSSID is divided into two sets id_net and id_oon, where id_net is a set defined for UE in coverage of a synchronization source, and id_oon is a set defined for UE out of the coverage of the synchronization source. A priority of UE with an SLSSID in the set id_net is higher than a priority of UE with an SLSSID in the set id_oon. The MIB-SL includes timing information and some configuration parameters. When an inCoverage field in the MIB-SL is set to true, it indicates that the device is in the coverage of the synchronization source; or when the inCoverage field in the MIB-SL is set to false, it indicates that the device is out of the coverage of the synchronization source. In this case, after the synchronization information is received, a priority of the device may be determined based on the SLSSID and the MIB-SL. For example, if an SLSSID of UE 1 belongs to id_net and the inCoverage field in the MIB-SL is true, and an SLSSID of UE 2 belongs to id_net and the inCoverage field in the MIB-SL is false, a priority of the UE 1 is higher than a priority of the UE 2.

In some of the foregoing implementations, when the time is less than the second threshold, the first device determines, based on the synchronization information, whether the another device includes a third device, where the third device is a device that is located in the coverage of the synchronization source; and when the third device exists, the first device determines a clock of the third device as the target clock.

In some of the foregoing implementations, that the first time is less than the first threshold includes: when the first device moves from IC to OOC, a first timer is started, and a value of the first timer is set to the first threshold. When the first timer is running, it indicates that the first time is less than the first threshold. If the first timer is running, when the first device is IC, the first timer is stopped.

In some of the foregoing implementations, that the first time is less than the second threshold includes: when the first device moves from IC to OOC, a second timer is started, and a value of the second timer is set to the second threshold. When the second timer is running, it indicates that the first time is less than the second threshold. If the second timer is running, when the first device is IC, the second timer is stopped.

In some of the foregoing implementations, that the first time is greater than the third threshold but less than the fourth threshold includes: when the first device moves from IC to OOC, a third timer is started, and a value of the third timer is set to the third threshold. When the third timer is not running, it indicates that the first time is greater than the third threshold. If the third timer is running, when the first device is IC, the third timer is stopped. When the first device moves from IC to OOC, a fourth timer is started, and a value of the fourth timer is set to the fourth threshold. When the fourth timer is running, it indicates that the first time is less than the fourth threshold. If the fourth timer is running, when the first device is IC, the fourth timer is stopped.

DESCRIPTION OF EMBODIMENTS

In the prior art, to ensure a synchronized state of devices performing D2D communication, for UE located IC of a synchronization source, the UE selects the synchronization source as a synchronization reference source of the UE; for UE located OOC after receiving synchronization information of another device, the UE determines a priority of the another device based on the received synchronization information, and then selects, from the another device, a device with a highest priority as a synchronization reference source. For example, UE 1 is located OOC, UE 2 is located IC, UE 3 is located OOC and uses the IC UE 2 as a synchronization source, and UE 4 is located OOC and uses the OOC UE 3 as a synchronization source. If the UE 1 finds synchronization information of the UE 2, the UE 3, and the UE 4, the UE 1 determines, based on the found synchronization information, that the UE 2 has a first priority, the UE 3 has a second priority, and the UE 4 has a third priority. In other words, the UE 2 has a highest priority and the UE 4 has a lowest priority. Subsequently, the UE 4 selects the UE 2 as a synchronization reference source of the UE 4.

In the foregoing process of selecting a synchronization reference source, if the UE 1 is a device that just moves to OOC, and the UE 1 finds no surrounding IC device (for example, the UE 2) based on the received synchronization information, it is inappropriate for the UE 1 to select UE that is not synchronized with IC as the synchronization reference source, because the UE 1 can still remain consistent with a clock of the synchronization reference source after being disconnected from the synchronization reference source, and in this case, a clock of the UE 1 is relatively accurate. Therefore, an embodiment of the present invention provides a synchronization method in D2D communication. When UE that moves from IC to OOC selects a synchronization reference device, if the UE fails to find a synchronization reference source with a higher priority within a period after the UE leaves coverage of a synchronization source, the UE does not select another device as the synchronization reference device of the UE, but uses a clock of the UE as the synchronization reference source instead. In other words, the UE keeps the clock of the UE unchanged. In this way, the synchronization reference source can be selected more accurately for the UE, facilitating proper D2D communication between the UE and another device.

It should be understood that OOC and IC in the embodiments of the present invention are specific to one type of synchronization source, for example, a base station/cell, a global navigation satellite system (Global Navigation Satellite System, GNSS), or an equivalent GNSS. When a base station is synchronized with a GNSS, timing of the base station is consistent with timing of the GNSS, and the base station is the equivalent GNSS. A base station may send a difference between timing of the base station and timing of a GNSS, and UE may determine the timing of the GNSS based on the timing of the base station and the difference. In this case, the UE has timing of the equivalent GNSS. IC UE or OOC UE may be defined based on existence of a signal of a synchronization source. For example, when a synchronization source is the GNSS or the equivalent GNSS, if UE finds that a signal of the GNSS/the equivalent GNSS meets a rule, the UE is IC UE. If the UE fails to find any signal of the GNSS/the equivalent GNSS, or if the UE finds that a signal of the GNSS/the equivalent GNSS does not meet a rule, the UE is OOC UE. It should be understood that the rule may be set based on measurement of a signal of the GNSS/the equivalent GNSS, for example, a carrier-to-noise ratio (carrier-to-noise ratio), reference signal received power (Reference Signal Received Power, RSRP), reference signal received quality (Reference Signal Received Quality, RSRQ), signal reliability, or a combination of the foregoing parameters. The IC UE may be expressed as UE with the GNSS/the equivalent GNSS, or UE synchronized with the GNSS/the equivalent GNSS. The OOC UE may be expressed as UE without the GNSS/the equivalent GNSS, or UE not synchronized with the GNSS/the equivalent GNSS.

Figure 2:
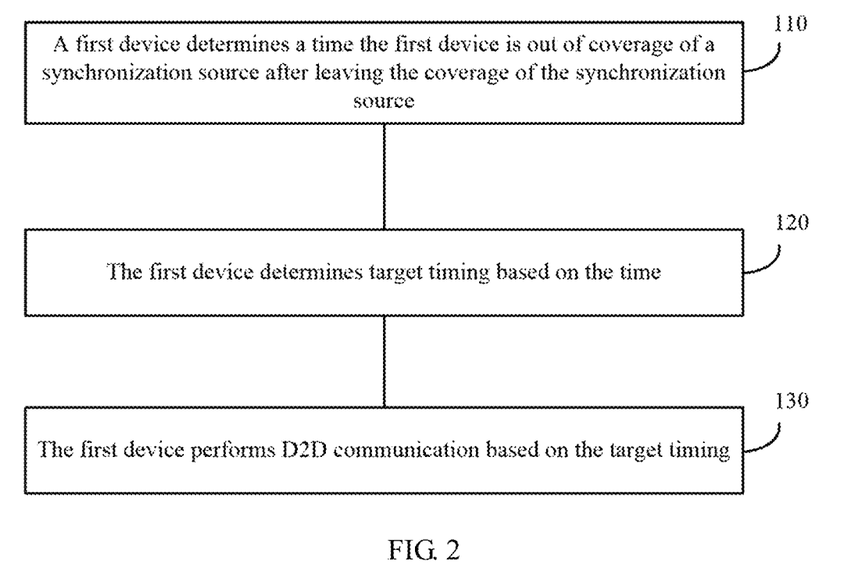
FIG. 2 is a schematic flowchart of a D2D communication method according to an embodiment of the present invention.

With reference to FIG. 2, the following describes in detail a D2D communication method according to an embodiment of the present invention. Specific steps of the method are as follows:

110. A first device determines a time the first device is out of coverage of a synchronization source after leaving the coverage of the synchronization source.

The time the first device is out of the coverage of the synchronization source after leaving the coverage of the synchronization source may be recorded by using a timer of the first device. When the first device needs to perform D2D communication, the first device may obtain the time from the timer. It should be understood that the time is a time value. For example, the time may be a time period of two minutes or three minutes.

120. The first device determines target timing based on the time.

It should be understood that for determining the target timing, another device or the first device may be selected as a synchronization reference source, and then timing of the synchronization reference source is used as the target timing. In this case, determining the target timing and then performing D2D communication based on the target timing is substantially consistent with determining the timing of the synchronization reference source and then performing D2D communication based on the timing of the synchronization reference source. For determining the target timing, a synchronization reference source may not be selected, and timing of the first device is used as the target timing. In this case, determining the target timing and then performing D2D communication based on the target timing is substantially consistent with selecting no synchronization reference source and performing D2D communication based on the timing of the first device. In addition, the another device herein may be a device of which an SLSSID and a MIB-SL message are found by the first device and a signal meets a rule. The another device may be UE, a GNSS, or a base station.

130. The first device performs D2D communication based on the target timing.

It should be understood that after determining the target timing, the first device may perform D2D communication with another device. Specifically, the D2D communication herein may include sending, monitoring, and receiving a sidelink communication (Sidelink communication), and sending, monitoring, and receiving a sidelink discovery (Sidelink discovery).

Different from the prior art in which a synchronization reference source is determined based on only found synchronization information of another device, in this embodiment of the present invention, the time the first device is out of the coverage of the synchronization source after leaving the coverage of the synchronization source is considered during determining of the target timing of the first device. In this way, the target timing can be selected more accurately for the first device. Therefore, when the time the first device is out of the coverage of the synchronization source after leaving the coverage of the synchronization source is relatively short, the timing of the first device may be directly selected as the target timing without consideration of synchronization information of another device. In this way, the target timing can be determined more accurately and more conveniently.

Optionally, in an embodiment, when the time the first device is out of the coverage of the synchronization source after leaving the coverage of the synchronization source is less than a first threshold, it may be considered that the time the first device is out of the coverage of the synchronization source after leaving the coverage of the synchronization source is relatively short, the timing of the first device changes slightly and is basically the same as timing of the synchronization source, or the first device is synchronized with the synchronization source. In this case, the first device does not select the target timing from another device, but instead, the first device directly uses the timing of the first device as the target timing. In this case, the first device performs D2D communication based on the timing of the first device. The first threshold herein may be preconfigured, or may be configured by a network, a base station, or a cell, or may be directly specified in a standard, or may be dependent upon UE implementation. When the first threshold is configured by a network, a base station, or a cell, the first threshold may be indicated by using system information. More specifically, the first threshold may be indicated by using a system information block. The first threshold may be represented by a string of bits, or may be represented by some predefined enumerated values (each enumerated value may be corresponding to one threshold), or may be represented by some predefined integers (each integer is corresponding to one threshold).

Optionally, in an embodiment, if the first time is greater than the first threshold, it may be considered that the time the first device is out of the coverage of the synchronization source after leaving the coverage of the synchronization source is relatively long, the timing of the first device changes relatively greatly and has a relatively large difference from timing of the synchronization source, or the first device is not synchronized with the synchronization source, and it is inappropriate to use the timing of the first device as the target clock for D2D communication. In this case, the first device may select a device with a relatively high priority from other devices based on priorities and synchronization information of the other devices, and use timing of the device with the highest priority as the target timing. Specifically, when a device for target timing is selected from the other devices based on the priorities, a device that is located in the coverage of the synchronization source may be selected most preferentially, a device that is located out of the coverage of the synchronization source and that selects a synchronization reference source in the coverage of the synchronization source may be selected second-most preferentially, and a device that is located out of the coverage of the synchronization source and that selects a synchronization reference source out of the coverage of the synchronization source may be selected third-most preferentially.

Optionally, in an embodiment, the first device may further find synchronization information of another device, and then determine the target timing based on the first time and the found synchronization information of the another device. If it is found that a device in the another device has a higher priority than the first device, timing of the device with the higher priority may be selected as the target timing. The device with the higher priority herein may be UE located in the coverage of the synchronization source, or a device different from UE. For example, when the synchronization source is a GNSS, a priority of a base station/cell may be higher than that of the first device. For another example, when the synchronization source is a base station/cell, a GNSS may have a higher priority than the first device. When the first time is less than the first threshold, or when the first time is less than the first preset threshold but greater than a second preset threshold, if synchronization information of another device with a higher priority is not found, the first device does not select the synchronization reference source from the another device. Instead, the first device keeps the timing of the first device, and the first device performs D2D communication based on the timing of the first device. Optionally, when the first time is less than the first threshold, and a target device exists in the another device, the first device may select timing of the target device as the target timing, or use the timing of the first device as the target timing. In this case, a priority of the first device is the same as a priority of the target device.

Specifically, when the synchronization reference source is determined based on the first time and the found synchronization information of the another device, a device with a highest priority may be selected from the another device based on priorities of devices, and timing of the device is determined as the target timing. If UE 1 is a device out of coverage of a synchronization source, and it is determined, based on synchronization information of other devices, that the other devices include UE 2 that is directly located in the coverage of the synchronization source, UE 3 that selects a device in the coverage of the synchronization source as a synchronization reference source, and UE 4 that is located out of the coverage of the synchronization source and that does not select a device in the coverage of the synchronization source as a synchronization reference source, priorities of the devices may be set to any one of the following cases:

Case 1: When a time the UE 1 is out of the coverage of the synchronization source after leaving the coverage of the synchronization source is less than the first threshold, the priorities may be set as follows: The UE 1 has a higher priority than the UE 2, the UE 2 has a same priority as the UE 3, and the UE 3 has a higher priority than the UE 4.

Case 2: When a time the UE 1 is out of the coverage of the synchronization source after leaving the coverage of the synchronization source is less than a second threshold, the priorities may be set as follows: The UE 2 has a same priority as the UE 3, the UE 3 has a higher priority than the UE 1, and the UE 1 has a higher priority than the UE 4.

Case 3: When a time the UE 1 is out of the coverage of the synchronization source after leaving the coverage of the synchronization source is greater than a third threshold but less than a fourth threshold, the priorities may be set as follows: The UE 2 has a same priority as the UE 3, the UE 3 has a higher priority than the UE 1, and the UE 1 has a higher priority than the UE 4.

It should be understood that actually, in addition to the foregoing several possible priority setting manners, many other priority setting manners may be used. This is not limited in this embodiment of the present invention.

Optionally, in an embodiment, when the time the first device is out of the coverage of the synchronization source after leaving the coverage of the synchronization source is less than a second threshold, and the first device finds synchronization information of a target device from the synchronization information of the another device, the first device determines timing of the target device as the target timing. When the time the first device is out of the coverage of the synchronization source after leaving the coverage of the synchronization source is less than the second threshold, and the first device fails to find synchronization information of a target device from the synchronization information of the another device, the first device determines timing of the first device as the target timing, where the target device is a device in the coverage of the synchronization source, or the target device is a device that selects a device in the coverage of the synchronization source as a synchronization reference source.

Optionally, the first device may first determine, based on the found synchronization information, whether the synchronization information includes synchronization information of the target device. If the target device exists, the timing of the target device is determined as the target timing. If the target device does not exist, a relationship between the first time and the preset threshold is determined. For example, when the first time is less than the first threshold, the timing of the first device is selected as the target timing. Optionally, when the first time is greater than the second threshold, the first device selects the target device from the another device based on the synchronization information of the another device, and determines the timing of the target device as the target timing.

In addition, when the target device includes two devices UE 1 and UE 2 (the UE 1 is a device in the coverage of the synchronization source, and the UE 2 is a device that selects a device in the coverage of the synchronization source as a synchronization reference source), the first device may preferentially select timing of the UE 1 as the target timing.

Optionally, in an embodiment, when the first time is less than a third threshold, the first device determines timing of the first device as the target timing; or when the time is greater than the third threshold but less than a fourth threshold, and the first device finds synchronization information of a target device from the synchronization information of the another device, the first device determines timing of the target device as the target timing; or when the time is greater than the third threshold but less than the fourth threshold, and the first device fails to find synchronization information of a target device from the synchronization information of the another device, the first device determines timing of the first device as the target timing, where the target device is a device in the coverage of the synchronization source, or the target device is a device that selects a device in the coverage of the synchronization source as a synchronization reference source.

Optionally, in an embodiment, when the first device finds synchronization information of a second device, and the synchronization information of the second device includes indication information that indicates a time the second device is out of the coverage of the synchronization source after leaving the coverage of the synchronization source, the first device may determine the target timing based on the first time and the indication information. Specifically, the time the first device is out of the coverage of the synchronization source after leaving the coverage of the synchronization source is a first time, and the first device determines, based on the indication information, that the time the second device is out of the coverage of the synchronization source after leaving the coverage of the synchronization source is a second time. The first device determines the target timing based on the first time and the second time. For example, if the second time is less than the first time, the first device determines timing of the second device as the target timing.

Optionally, the foregoing embodiment may further include the following two cases:

The time the first device is out of the coverage of the synchronization source after leaving the coverage of the synchronization source is the first time, and the first device determines, based on the indication information, that the time the second device is out of the coverage of the synchronization source after leaving the coverage of the synchronization source is less than the first threshold. When the first time is greater than the first threshold, the first device determines the timing of the second device as the target timing.

The time the first device is out of the coverage of the synchronization source after leaving the coverage of the synchronization source is the first time, and the first device determines, based on the indication information, that the time the second device is out of the coverage of the synchronization source after leaving the coverage of the synchronization source is greater than the first threshold. When the first time is less than the first threshold, the first device determines the timing of the first device as the target timing.

Optionally, in an embodiment, when the first device finds synchronization information of a second device, and the synchronization information of the second device includes indication information that indicates a time the second device is out of the coverage of the synchronization source after leaving the coverage of the synchronization source, the first device may determine the target timing based on the first time, the indication information, and the synchronization information of the another device. Specifically, the first device may determine, based on the indication information, that the time the second device is out of the coverage of the synchronization source after leaving the coverage of the synchronization source is a second time, and then the first device determines the target timing based on the first time the first device is out of the coverage of the synchronization source after leaving the coverage of the synchronization source, the second time, and the synchronization information of the another device. For example, based on priorities of the first device, the second device, and the another device, the first device may select a device with a highest priority, and uses timing of the device as the target timing. If a third device exists in the another device, and the third device is a device in the coverage of the synchronization source, the first time is two minutes, and the second time is three minutes, it may be considered that the third device has a higher priority than the first device, and the first device has a higher priority than the second device. In this case, the first device selects timing of the third device as the target timing.

Optionally, the time the first device is out of the coverage of the synchronization source after leaving the coverage of the synchronization source is the first time, and the first device determines, based on the indication information, that the time the second device is out of the coverage of the synchronization source after leaving the coverage of the synchronization source is less than the first threshold. When the first time is greater than the first threshold, the first device finds synchronization information of a third device, and the third device is a device in the coverage of the synchronization source, the first device determines timing of the third device as the target timing.

Optionally, the time the first device is out of the coverage of the synchronization source after leaving the coverage of the synchronization source is the first time, and the first device determines, based on the indication information, that the time the second device is out of the coverage of the synchronization source after leaving the coverage of the synchronization source is less than the first threshold. When the first time is greater than the first threshold, the first device finds synchronization information of a third device, and the third device is a device in the coverage of the synchronization source, the first device determines the timing of the second device as the target timing.

Optionally, in an embodiment, the first threshold and/or the second threshold and/or the third threshold are/is specified in a standard. In other words, a related communication standard has specified values of the first threshold, the second threshold, and the third threshold. Alternatively, at least one of the first threshold, the second threshold, and the third threshold is preconfigured, or may be configured by a base station.

Optionally, the first threshold and/or the second threshold and/or the third threshold may be indicated by using system information sent by a base station or by using MIB-SL information sent by a device different from the first device.

Optionally, in an embodiment, the first threshold and/or the second threshold and/or the third threshold may be indicated by using system information sent by a base station or by using a sidelink master information block MIB-SL sent by a device different from the first device.

The foregoing preset thresholds (the first threshold, the second threshold, and the third threshold) may be represented by a string of bits, or may be represented by some predefined enumerated values (each enumerated value may be corresponding to one threshold), or may be represented by some predefined integers (each integer is corresponding to one threshold).

In this embodiment, when the first device selects the target timing, the time the first device is out of the coverage of the synchronization source after leaving the coverage of the synchronization source is considered. In this way, the target timing can be selected more accurately for the first device. It should be understood that when the first device determines the target timing or the synchronization reference source, if the first device finds indication information of a surrounding second device, and determines, based on the indication information, a time the second device is out of the coverage of the synchronization source after leaving the coverage of the synchronization source, the first device selects the synchronization reference source based on the indication information of the second device. With reference to specific embodiments, the following details a method for selecting a synchronization reference source and performing D2D communication when a second device exists.

Optionally, in an embodiment, the first device finds synchronization information of the second device, and the synchronization information of the second device includes indication information that indicates a time the second device is out of the coverage of the synchronization source after leaving the coverage of the synchronization source. The first device selects a synchronization reference source based on the indication information. The first device performs D2D communication based on timing of the synchronization reference source. The second device may be a device that just changes from being in the coverage of the synchronization source to being out of the coverage of the synchronization source, and the indication information of the second device indicates the time the second device is out of the coverage of the synchronization source after leaving the coverage of the synchronization source. If the time is quite short, for example, less than a threshold, it may be considered that the second device has a relatively high priority, and a clock or timing of the second device is relatively accurate. In this case, the first device may directly select the second device as the synchronization reference source. Alternatively, if the indication information directly indicates that the time the second device is out of the coverage of the synchronization source after leaving the coverage of the synchronization source is less than a threshold, it may be considered that the second device has a relatively high priority, and the clock or the timing of the second device is relatively accurate. In this case, the first device may directly select the second device as the synchronization reference source.

Different from the prior art in which target timing is determined based on only found synchronization information of another device, in this embodiment of the present invention, the time the second device is out of the coverage of the synchronization source after leaving the coverage of the synchronization source is considered during determining of the target timing. In this way, the target timing can be selected more accurately for the first device.

Specifically, when selecting the synchronization reference source based on the indication information, the first device may first determine a priority of the second device based on the indication information. If the first device fails to find another device with a priority higher than that of the second device, the first device selects the second device as the synchronization reference source. For example, if the first device finds a surrounding third device in the coverage of the synchronization source, it may be considered that the second device has a lower priority than the third device, and the first device selects the third device as the synchronization reference source. If the first device finds a surrounding fourth device and a surrounding fifth device that are located out of the coverage of the synchronization source, it may be considered that the fourth device and the fifth device have lower priorities than the second device, and the first device may select the second device as the synchronization reference source.

The indication information of the second device may be indicated by using a sidelink synchronization signal SLSS or a sidelink master information block MIB-SL.

Figure 3:
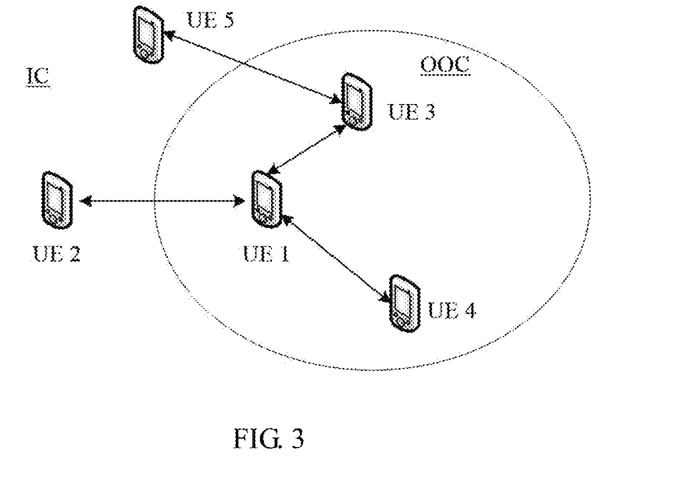
FIG. 3 is a schematic diagram of a D2D communication method according to an embodiment of the present invention.
Figure 4:
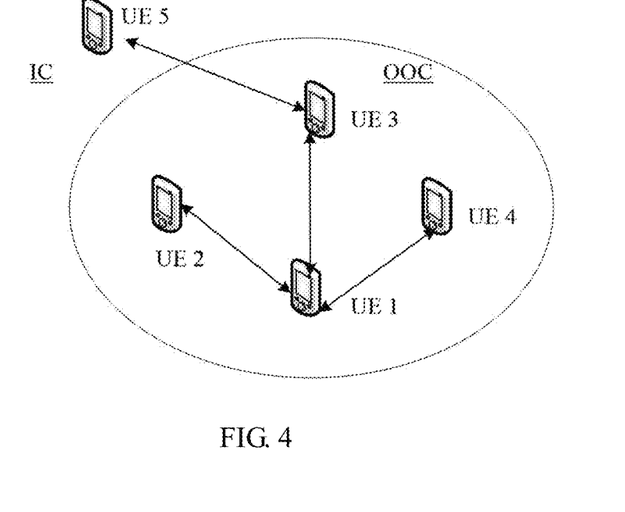
FIG. 4 is a schematic diagram of a D2D communication method according to an embodiment of the present invention.

With reference to FIG. 3 and FIG. 4, and by using specific examples, the following describes in detail the device-to-device D2D communication method in the embodiments of the present invention.

In FIG. 3, UE 1 is a device that is out of coverage of a synchronization source for a period of time after leaving the coverage of the synchronization source, UE 2 and UE 5 are devices that are located in the coverage of the synchronization source, a synchronization reference source of UE 3 is the UE 5, and UE 4 is a device that is located out of the coverage of the synchronization source. If the UE 1 finds synchronization information of the UE 2, the UE 3, and the UE 4, the UE 1 directly selects timing of the UE 2 or the UE 3 as target timing.

In FIG. 4, UE 1 and UE 4 are devices that are located out of coverage of a synchronization source, UE 2 is a device that is out of the coverage of the synchronization source for a period of time after leaving the coverage of the synchronization resource, UE 5 is a device that is located in the coverage of the synchronization source, and a synchronization reference source of UE 3 is the UE 5. After the UE 1 finds indication information of the UE 2, and synchronization information of the UE 3 and the UE 4, if the UE 1 determines, based on the indication information, that a time the UE 2 is out of the coverage of the synchronization source after leaving the coverage of the synchronization resource is less than a preset threshold, the UE 1 may directly select timing of the UE 2 as target timing.

It should be understood that a device or a terminal in the embodiments of the present invention may be a device performing D2D communication. More specifically, the D2D communication performed by the device or the terminal may be vehicle to vehicle (Vehicle to Vehicle, V2V) communication, vehicle to infrastructure (Vehicle to Infrastructure, V2I) communication, vehicle to X (Vehicle to X, V2X) communication, or the like. Such technologies can allow a vehicle to communicate continuously with all other nearby vehicles and road infrastructures, for example, communicate with an infrastructure such as a traffic light or a railway crossing. The device performing communication may be specifically an in-vehicle remote information processing system, an in-vehicle unit, or a mobile device such as a smartphone.

The foregoing describes in detail, with reference to FIG. 2 to FIG. 4, the D2D communication method in the embodiments of the present invention. The following describes in detail the D2D terminal device in the embodiments of the present invention with reference to FIG. 5 to FIG. 8. It should be understood that the D2D terminal device in FIG. 5 to FIG. 8 can implement steps of the D2D communication method shown in FIG. 2 to FIG. 4. For brevity, descriptions are not repeated.

Figure 5:
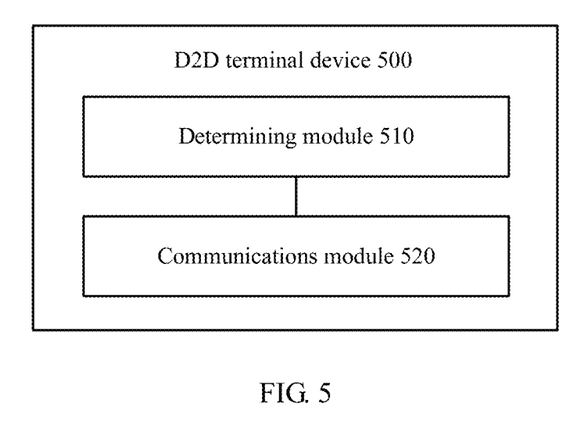
FIG. 5 is a schematic block diagram of a D2D terminal device according to an embodiment of the present invention.

FIG. 5 is a schematic block diagram of a D2D terminal device according to an embodiment of the present invention. The D2D terminal device 500 includes:

a determining module 510, configured to determine a time the D2D terminal device is out of coverage of a synchronization source after leaving the coverage of the synchronization source; where the determining module 510 is further configured to determine target timing based on the time; and a communications module 520, configured to perform D2D communication based on the target timing.

Different from the prior art in which target timing is determined based on only found synchronization information of another device, in this embodiment of the present invention, the time the first device is out of the coverage of the synchronization source after leaving the coverage of the synchronization source is considered during determining of the target timing. In this way, the target timing can be selected more accurately for the first device.

Optionally, in an embodiment, the determining module 510 is specifically configured to: when the time is less than a first threshold, determine timing of the D2D terminal device as the target timing.

Optionally, in an embodiment, the D2D terminal device 500 further includes:

a detection module 530, where when the detection module 530 finds synchronization information of another D2D terminal device, the determining module 510 is specifically configured to determine the target timing based on the time and the synchronization information of the another D2D terminal device.

Optionally, in an embodiment, the determining module 510 is specifically configured to: when the time is less than a second threshold, and the detection module finds synchronization information of a target D2D terminal device from the synchronization information of the another D2D terminal device, determine timing of the target D2D terminal device as the target timing; or when the time is less than the second threshold, and the detection module fails to find synchronization information of a target D2D terminal device from the synchronization information of the another D2D terminal device, determine timing of the D2D terminal device as the target timing. The target D2D terminal device is a device in the coverage of the synchronization source, or the target D2D terminal device is a device that selects a device in the coverage of the synchronization source as a synchronization reference source.

Optionally, in an embodiment, the determining module 510 is specifically configured to: when the time is less than a third threshold, determine timing of the D2D terminal device as the target timing; or when the time is greater than the third threshold but less than a fourth threshold, and the detection module finds synchronization information of a target D2D terminal device from the synchronization information of the another D2D terminal device, determine timing of the target D2D terminal device as the target timing; or when the time is greater than the third threshold but less than the fourth threshold, and the detection module fails to find synchronization information of a target D2D terminal device from the synchronization information of the another D2D terminal device, determine timing of the D2D terminal device as the target timing. The target D2D terminal device is a device in the coverage of the synchronization source, or the target D2D terminal device is a device that selects a device in the coverage of the synchronization source as a synchronization reference source.

Optionally, in an embodiment, the determining module 510 is specifically configured to: when the time is greater than the second threshold, select a target D2D terminal device from the another D2D terminal device based on the synchronization information of the another D2D terminal device, and determine timing of the target D2D terminal device as the target timing.

Optionally, in an embodiment, the detection module 530 finds synchronization information of a second D2D terminal device, where the synchronization information of the second D2D terminal device includes indication information that indicates a time the second D2D terminal device is out of the coverage of the synchronization source after leaving the coverage of the synchronization source; and the determining module 510 is specifically configured to determine the target timing based on the time and the indication information.

Optionally, in an embodiment, the detection module 530 finds synchronization information of a second D2D terminal device, where the synchronization information of the second D2D terminal device includes indication information that indicates a time the second D2D terminal device is out of the coverage of the synchronization source after leaving the coverage of the synchronization source; and the determining module 510 is specifically configured to determine the target timing based on the time, the indication information, and the synchronization information of the another D2D terminal device.

Optionally, in an embodiment, the first threshold is pre-configured.

Optionally, in an embodiment, the first threshold is configured by a base station.

Optionally, in an embodiment, the first threshold is indicated by using system information sent by a base station or by using a sidelink master information block MIB-SL sent by a device different from the first device.

Figure 6:
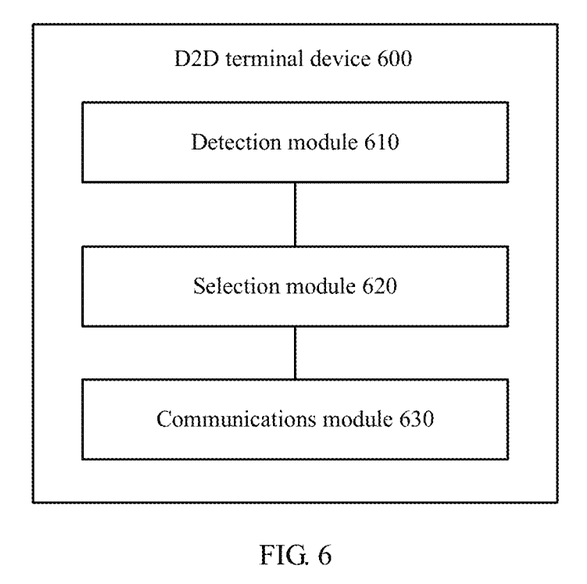
FIG. 6 is a schematic block diagram of a D2D terminal device according to an embodiment of the present invention.

FIG. 6 is a schematic block diagram of a D2D terminal device according to an embodiment of the present invention. The D2D terminal device 600 includes:

a detection module 610;

a selection module 620, where when the detection module finds synchronization information of another D2D terminal, and the synchronization information of the another D2D terminal includes indication information that indicates a time the second device is out of coverage of a synchronization source after leaving the coverage of the synchronization source, the selection module 620 is configured to select a synchronization reference source based on the indication information; and a communications module 630, configured to perform D2D communication based on timing of the synchronization reference source.

Different from the prior art in which target timing is determined based on only found synchronization information of another device, in this embodiment of the present invention, the time the second device is out of the coverage of the synchronization source after leaving the coverage of the synchronization source is considered during determining of the target timing. In this way, the target timing can be selected more accurately for the first device.

Optionally, in an embodiment, the selection module 620 is specifically configured to: determine a priority of the another D2D terminal based on the indication information; and when the detection module 610 fails to find a device whose priority is higher than the priority of the another D2D terminal device, select the D2D terminal device as the synchronization reference source.

Optionally, in an embodiment, the indication information is indicated by using a sidelink synchronization signal SLSS or a sidelink master information block MIB-SL.

Figure 7:
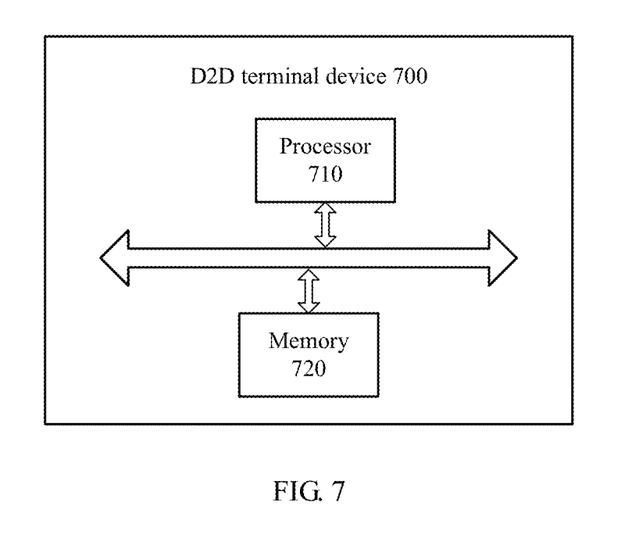
FIG. 7 is a schematic block diagram of a D2D terminal device according to an embodiment of the present invention.

FIG. 7 is a schematic block diagram of a D2D terminal device according to an embodiment of the present invention. The D2D terminal device 700 includes:

a memory 720, configured to store a program; and a processor 710, where when the program is executed, the processor 710 is configured to: determine a time the D2D terminal device is out of coverage of a synchronization source after leaving the coverage of the synchronization source, determine target timing based on the time, and perform D2D communication based on the target timing.

Different from the prior art in which target timing is determined based on only found synchronization information of another device, in this embodiment of the present invention, the time the first device is out of the coverage of the synchronization source after leaving the coverage of the synchronization source is considered during determining of the target timing. In this way, the target timing can be selected more accurately for the first device.

Optionally, in an embodiment, the processor 710 is configured to: when the time is less than a first threshold, determine timing of the D2D terminal device as the target timing.

Optionally, in an embodiment, the processor 710 is configured to: when synchronization information of another D2D terminal device is found, determine the target timing based on the time and the synchronization information of the another D2D terminal device.

Optionally, in an embodiment, the processor 710 is configured to: when the time is less than a second threshold, and synchronization information of a target D2D terminal device is found from the synchronization information of the another D2D terminal device, determine timing of the target D2D terminal device as the target timing; or when the time is less than the second threshold, and synchronization information of a target D2D terminal device is not found from the synchronization information of the another D2D terminal device, determine timing of the D2D terminal device as the target timing, where the target D2D terminal device is a device in the coverage of the synchronization source, or the target D2D terminal device is a device that selects a device in the coverage of the synchronization source as a synchronization reference source.

Optionally, in an embodiment, the processor 710 is configured to: when the time is less than a third threshold, determine timing of the D2D terminal device as the target timing; or when the time is greater than the third threshold but less than a fourth threshold, and synchronization information of a target D2D terminal device is found from the synchronization information of the another D2D terminal device, determine timing of the target D2D terminal device as the target timing; or when the time is greater than the third threshold but less than the fourth threshold, and synchronization information of a target D2D terminal device is not found from the synchronization information of the another D2D terminal device, determine timing of the D2D terminal device as the target timing, where the target D2D terminal device is a device in the coverage of the synchronization source, or the target D2D terminal device is a device that selects a device in the coverage of the synchronization source as a synchronization reference source.

Optionally, in an embodiment, the processor 710 is configured to: when the time is greater than the second threshold, select a target D2D terminal device from the another D2D terminal device based on the synchronization information of the another D2D terminal device, and determine timing of the target D2D terminal device as the target timing.

Optionally, in an embodiment, the processor 710 is configured to: when synchronization information of a second D2D terminal device is found, and the synchronization information of the second D2D terminal device includes indication information that indicates a time the second D2D terminal device is out of the coverage of the synchronization source after leaving the coverage of the synchronization source, determine the target timing based on the time and the indication information.

Optionally, in an embodiment, the processor 710 is configured to: when synchronization information of a second D2D terminal device is found, and the synchronization information of the second D2D terminal device includes indication information that indicates a time the second D2D terminal device is out of the coverage of the synchronization source after leaving the coverage of the synchronization source, determine the target timing based on the time, the indication information, and the synchronization information of the another D2D terminal device.

Optionally, in an embodiment, the first threshold is preconfigured.

Optionally, in an embodiment, the first threshold is configured by a base station.

Optionally, in an embodiment, the first threshold is indicated by using system information sent by a base station or by using a sidelink master information block MIB-SL sent by a device different from the first device.

Figure 8:
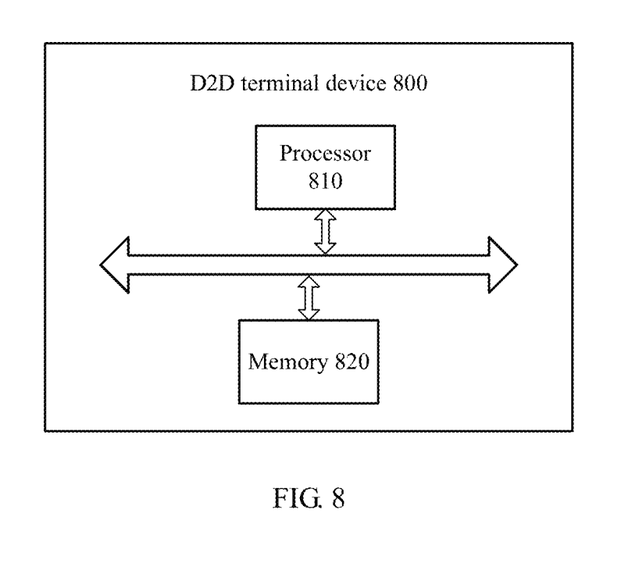
FIG. 8 is a schematic block diagram of a D2D terminal device according to an embodiment of the present invention.

FIG. 8 is a schematic block diagram of a D2D terminal device according to an embodiment of the present invention. The D2D terminal device 800 includes:

a memory 820, configured to store a program; and a processor 810, where when the program is executed, the processor 810 is configured to: when synchronization information of another D2D terminal is found, and the synchronization information of the another D2D terminal includes indication information that indicates a time the second device is out of coverage of a synchronization source after leaving the coverage of the synchronization source, select a synchronization reference source based on the indication information, and perform D2D communication based on timing of the synchronization reference source.

Different from the prior art in which target timing is determined based on only found synchronization information of another device, in this embodiment of the present invention, the time the second device is out of the coverage of the synchronization source after leaving the coverage of the synchronization source is considered during determining of the target timing. In this way, the target timing can be selected more accurately for the first device.

Optionally, in an embodiment, the processor 810 is configured to: determine a priority of the another D2D terminal based on the indication information; and when a device whose priority is higher than the priority of the another D2D terminal device is not found, select the D2D terminal device as the synchronization reference source.

Optionally, in an embodiment, the indication information is indicated by using a sidelink synchronization signal SLSS or a sidelink master information block MIB-SL.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean an execution sequence in the embodiments of the present invention. The execution sequence of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A device-to-device (D2D) communication method, comprising:
   determining, by a first device, a time that the first device is out of coverage of a synchronization source after leaving the coverage of the synchronization source;
   searching, by the first device, synchronization information of a second device, wherein the synchronization information of the second device comprises indication information indicating a time that the second device is out of the coverage of the synchronization source;
   determining, by the first device, target timing based on the time and the indication information; and
   performing, by the first device, D2D communication based on the target timing.

2. The D2D communication method of claim 1, wherein the time is less than a first threshold, and wherein determining the target timing based on the time and the indication information comprises setting, by the first device, timing of the first device as the target timing.

3. The D2D communication method of claim 2, wherein the first threshold is indicated using system information from a base station or a sidelink master information block (MIB-SL) from a device different from the first device.

4. The D2D communication method of claim 1, further comprising:
   searching, by the first device, synchronization information of another device; and
   determining, by the first device, the target timing based on the time, the indication information, and the synchronization information of the other device.

5. The D2D communication method of claim 4, wherein determining the target timing based on the time, the indication information, and the synchronization information of the other device comprises:
   setting, by the first device, timing of a target device as the target timing when the time is less than a second threshold and the first device finds synchronization information of the target device from the synchronization information of the other device; and
   setting, by the first device, timing of the first device as the target timing when the time is less than the second threshold and the first device fails to find the synchronization information of the target device from the synchronization information of the other device, wherein the target device is a device in the coverage of the synchronization source or a device selecting a device in the coverage of the synchronization source as a synchronization reference source.

6. The D2D communication method of claim 4, wherein determining the target timing based on the time, the indication information, and the synchronization information of the other device comprises:
   setting, by the first device, timing of the first device as the target timing when the time is less than a third threshold;
   setting, by the first device, timing of a target device as the target timing when the time is greater than the third threshold and less than a fourth threshold and the first device finds synchronization information of the target device from the synchronization information of the other device; and
   setting, by the first device, the timing of the first device as the target timing when the time is greater than the third threshold and less than the fourth threshold, and the first device fails to find the synchronization information of the target device from the synchronization information of the other device, wherein the target device is a device in the coverage of the synchronization source a device selecting a device in the coverage of the synchronization source as a synchronization reference source.

7. The D2D communication method of claim 4, wherein the time is greater than a second threshold, and wherein determining the target timing based on the time, the indication information, and the synchronization information of the other device comprises:
   selecting, by the first device, a target device from the other device based on the synchronization information of the other device; and
   setting, by the first device, timing of the target device as the target timing.

8. A device-to-device (D2D) terminal device, comprising:
   a processor configured to:
      determine a time that the D2D terminal device is out of coverage of a synchronization source after leaving the coverage of the synchronization source;
      search synchronization information of a second device, wherein the synchronization information of the second device comprises indication information indicating a time that the second device is out of the coverage of the synchronization source; and
      determine target timing based on the time and the indication information; and
   a communications device coupled to the processor and configured to perform D2D communication based on the target timing.

9. The D2D terminal device of claim 8, wherein the time is less than a first threshold, and wherein the processor is further configured to determine timing of the D2D terminal device as the target timing.

10. The D2D terminal device of claim 8, wherein the processor is further configured to:
   search synchronization information of another D2D terminal device; and determine the target timing based on the time, the indication information, and the synchronization information of the other D2D terminal device.

11. The D2D terminal device of claim 10, wherein the processor is further configured to:
set timing of a target D2D terminal device as the target timing when the time is less than a second threshold and when the processor finds synchronization information of the target D2D terminal device from the synchronization information of the other D2D terminal device; and
set timing of the D2D terminal device as the target timing when the time is less than the second threshold and when the processor fails to find the synchronization information of the target D2D terminal device from the synchronization information of the other D2D terminal device, wherein the target D2D terminal device is a device in the coverage of the synchronization source or a device selecting a device in the coverage of the synchronization source as a synchronization reference source.

12. The D2D terminal device of claim 10, wherein the processor is configured to:
set timing of the D2D terminal device as the target timing when the time is less than a third threshold;
set timing of a target D2D terminal device as the target timing when the time is greater than the third threshold and less than a fourth threshold and when the processor finds synchronization information of the target D2D terminal device from the synchronization information of the other D2D terminal device; or
set the timing of the D2D terminal device as the target timing when the time is greater than the third threshold and less than the fourth threshold and when the processor fails to find the synchronization information of the target D2D terminal device from the synchronization information of the other D2D terminal device, wherein the target D2D terminal device is a device in the coverage of the synchronization source or a device selecting a device in the coverage of the synchronization source as a synchronization reference source.

13. The D2D terminal device of claim 10, wherein the time is greater than a second threshold, and wherein the processor is further configured to:
select a target D2D terminal device from the other D2D terminal device based on the synchronization information of the other D2D terminal device; and
set timing of the target D2D terminal device as the target timing.

14. A computer program product comprising computer-executable instructions for storage on a non-transitory computer-readable medium that, when executed by a processor, cause a device-to-device (D2D) terminal to:
determine a time that the D2D terminal device is out of coverage of a synchronization source after leaving the coverage of the synchronization source;
search synchronization information of a second device, wherein the synchronization information of the second device comprises indication information indicating a time that the second device is out of the coverage of the synchronization source;
determine target timing based on the time and the indication information; and
perform D2D communication based on the target timing.

15. The computer program product of claim 14, wherein the time is less than a first threshold, and wherein the processor is further configured to determine timing of the D2D terminal device as the target timing.

16. The computer program product of claim 14, wherein the computer-executable instructions further cause the D2D terminal to:
search synchronization information of another D2D terminal device; and
determine the target timing based on the time, the indication information, and the synchronization information of the other D2D terminal device.

17. The computer program product of claim 16, wherein the computer-executable instructions further cause the D2D terminal to:
set timing of a target D2D terminal device as the target timing when the time is less than a second threshold and when the processor finds synchronization information of the target D2D terminal device from the synchronization information of the other D2D terminal device; and
set timing of the D2D terminal device as the target timing when the time is less than the second threshold and when the processor fails to find the synchronization information of the target D2D terminal device from the synchronization information of the other D2D terminal device, wherein the target D2D terminal device is a device in the coverage of the synchronization source or a device selecting a device in the coverage of the synchronization source as a synchronization reference source.

18. The computer program product of claim 16, wherein the computer-executable instructions further cause the D2D terminal to:
set timing of the D2D terminal device as the target timing when the time is less than a third threshold;
set timing of a target D2D terminal device as the target timing when the time is greater than the third threshold and less than a fourth threshold and when the processor finds synchronization information of the target D2D terminal device from the synchronization information of the other D2D terminal device; or
set the timing of the D2D terminal device as the target timing when the time is greater than the third threshold and less than the fourth threshold and when the processor fails to find the synchronization information of the target D2D terminal device from the synchronization information of the other D2D terminal device, wherein the target D2D terminal device is a device in the coverage of the synchronization source or a device selecting a device in the coverage of the synchronization source as a synchronization reference source.

19. The computer program product of claim 16, wherein the computer-executable instructions further cause the D2D terminal to:
select a target D2D terminal device from the other D2D terminal device based on the synchronization information of the other D2D terminal device; and
set tuning of the target D2D terminal device as the target timing.

* * * * *

UNITED STATES PATENT AND TRADEMARK OFFICE
CERTIFICATE OF CORRECTION

PATENT NO. : 10,736,066 B2
APPLICATION NO. : 16/301332
DATED : August 4, 2020
INVENTOR(S) : Cai et al.

Page 1 of 1

It is certified that error appears in the above-identified patent and that said Letters Patent is hereby corrected as shown below:

In the Claims

Claim 19, Column 22, Line 61: "set tuning of the target" should read "set timing of the target"

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*